United States Patent
Braunschweiler

(10) Patent No.: US 7,962,341 B2
(45) Date of Patent: Jun. 14, 2011

(54) METHOD AND APPARATUS FOR LABELLING SPEECH

(75) Inventor: Norbert Braunschweiler, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1187 days.

(21) Appl. No.: 11/608,579

(22) Filed: Dec. 8, 2006

(65) Prior Publication Data

US 2007/0136062 A1    Jun. 14, 2007

(30) Foreign Application Priority Data

Dec. 8, 2005 (GB) ................................. 0525055.0

(51) Int. Cl.
*G10L 13/00* (2006.01)
(52) U.S. Cl. ............... 704/258; 704/260; 704/E13.011; 704/E13.013; 704/E13.014
(58) Field of Classification Search ................. 704/207, 704/258, 260, E13.011, E13.013, E13.014
See application file for complete search history.

(56) References Cited

U.S. PATENT DOCUMENTS

| | | | | |
|---|---|---|---|---|
| 5,490,234 | A * | 2/1996 | Narayan ....................... | 704/260 |
| 6,961,704 | B1 * | 11/2005 | Phillips et al. ............... | 704/268 |
| 7,035,791 | B2 * | 4/2006 | Chazan et al. ............... | 704/207 |
| 7,120,584 | B2 * | 10/2006 | Sheikhzadeh-Nadjar et al. ......... | 704/266 |
| 7,136,816 | B1 * | 11/2006 | Strom ........................... | 704/260 |
| 7,177,810 | B2 * | 2/2007 | Shriberg et al. ............... | 704/253 |
| 2005/0091045 | A1 | 4/2005 | Oh | |

FOREIGN PATENT DOCUMENTS

WO    WO 99/59138    11/1999

OTHER PUBLICATIONS

Gut et al. "Measuring the Reliability of Manual Annotations of Speech Corpora" Mar. 2004.*
Braunschweiler. "Automatic Detection of Prosodic Cues" 2003.*
Ananthakrishnan et al. "An Automatic Prosody Recognizer Using a Coupled Multi-Stream Acoustic Model and a Syntactic-Prosodic Language Model" Mar. 2005.*
Braunschweiler. "The Prosodizer—Automatic Prosodic Annotations of Speech Synthesis Databases" May 2006.*
Braunschweiler. "Automatic Labeling of Prosodic Events" 2000.*
Schweitzer et al. "Restricted Unlimited Domain Synthesis" 2003.*
Chen et al. "Improving the Robustness of Prosody Dependent Language Modeling Based on Prosody Syntax Dependence" 2003.*
Yeh et al. "Efficient text analyser with prosody generator-driven approach for Mandarin text-to-speech" Jun. 2005.*
Mixdorff et al. "Building An Integrated Prosodic Model of German" 2001.*
Mixdorff. "Speech Technology, ToBI, and Making Sense of Prosody" 2002.*

(Continued)

*Primary Examiner* — Richemond Dorvil
*Assistant Examiner* — Greg Borsetti
(74) *Attorney, Agent, or Firm* — Oblon, Spivak, McClelland, Maier & Neustadt, L.L.P.

(57) ABSTRACT

A method for the prosodic labelling of speech including performing a first analysis step using data from an audio file, wherein the audio file is analysed as a plurality of frames positioned at fixed time intervals in said audio file; and performing a second analysis step on said data from said audio file using results of said first analysis step, wherein analysis is performed using a plurality of analysis windows and wherein the position of the analysis windows are determined by segmental information.

17 Claims, 2 Drawing Sheets

OTHER PUBLICATIONS

Figure 1:
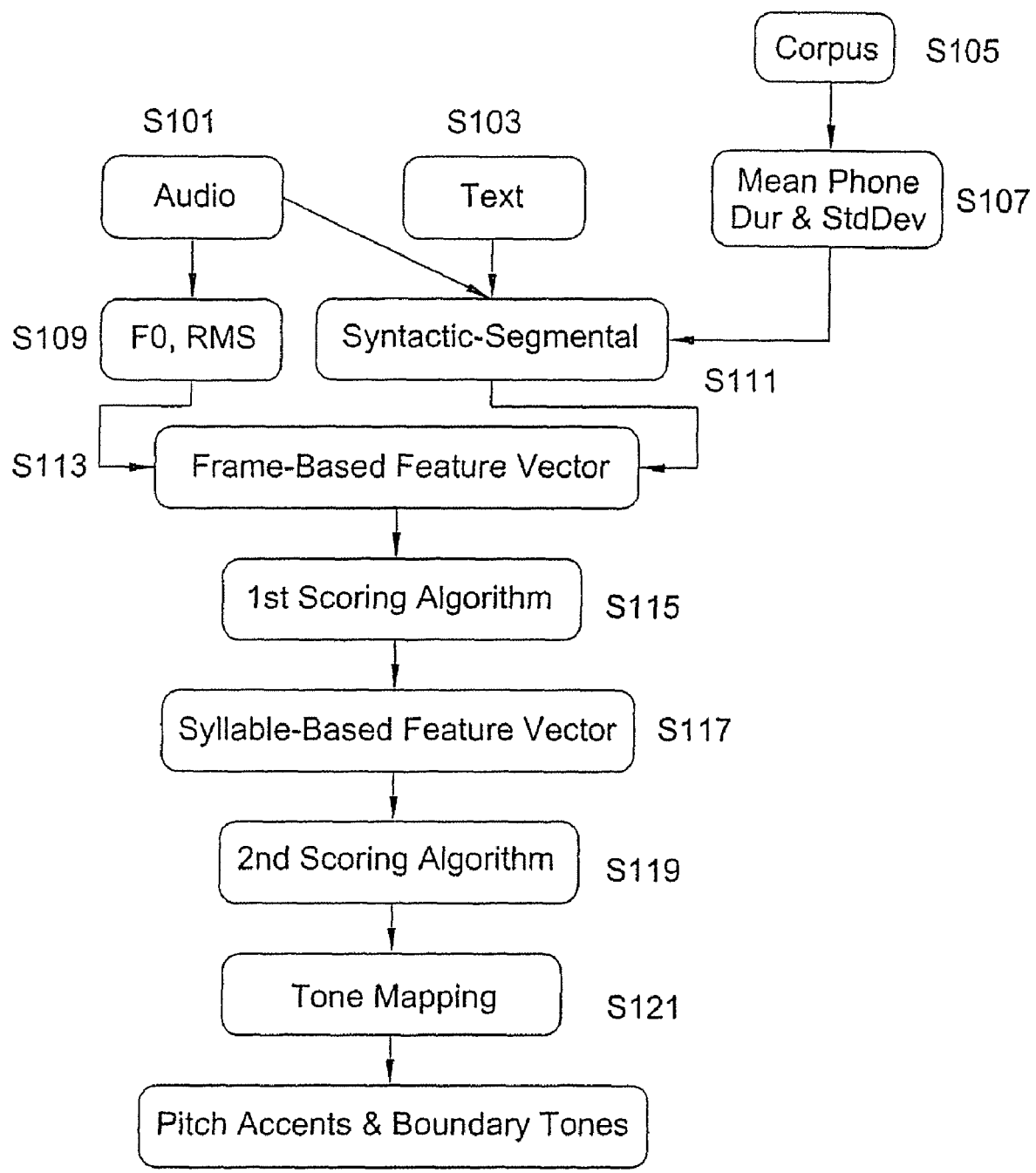

Paulo et al. "Automatic Phonetic Alignment and Its Confidence Measures" 2004.*

Ma et al. "Automatic Prosody Labeling Using Both Text and Acoustic Information" 2003.*

Syrdal et al. "Inter-Transcriber Reliability of ToBI Prosodic Labeling" 2000.*

Colin W. Wightman, et al., "Automatic Labeling of Prosodic Patterns", IEEE Transactions on Speech and Audio Processing, vol. 2, No. 4, Oct. 1994, pp. 469-481.

Ken Chen, et al., "An Automatic Prosody Labeling System Using ANN-based Syntactic-Prosodic Model and GMM-based Acoustic-Prosodic Model", ICASSP 2004, pp. 509-512.

Mary E. Beckman, et al., "Guidelines for ToBI Labelling", version 3.0, The Ohio State University Research Foundation, Mar. 1997, pp. 1-43.

Norbert Braunschweiler, ProsAlign—The Automatice Prosodic Aligner, ISBN 1-876346-48-5, 2003, pp. 3093-3096.

* cited by examiner

METHOD AND APPARATUS FOR LABELLING SPEECH

This application claims priority under 35 USC §119 of United Kingdom application number 0525055.0 filed Dec. 8, 2005, the entire contents of which are incorporated by reference herein.

The present invention relates to a method and apparatus for the prosodic labelling of speech.

Prosodic features are variations in pitch, length, loudness and rhythm during speech. The meaning attributed to speech in any language is often heavily dependent on these prosodic cues. Therefore, it is a challenge both in text to speech systems and automatic speech recognition systems to have a method of automatically labelling prosodic features. Further an automatic method of prosodic labelling may be used for computer based systems for linguistic analysis and language learning.

Previously, prosodic annotation of speech was mainly performed by trained human labellers. This is time consuming, costly and sensitive to the subjective considerations of the individual labellers.

Automatic methods have been developed using Hidden Markov Models (HMM) (see for example C. W. Wightman and M. Ostendorf, "Automatic Labelling of Prosodic Patterns", IEEE Transactions of Speech and Audio Processing, vol. 2, no 4, pp 469-481, October 1994). Also, decision trees, neural networks, Gaussian mixture models and combinations thereof have been used (see for example Chen et al "An automatic prosody labelling system using ANN based Syntactic-Prosodic model and GMM-based Acoustic-Prosodic Model", ICASSP 2004, Montreal, Canada, 509-512). The automatic methods developed so far have only recently reached a similar recognition accuracy to the human labellers. Also, the current automatic methods are difficult to adapt to new speakers and/or new languages.

The present invention attempts to address the above problems and, in a first aspect provides an apparatus for the prosodic labelling of speech comprising:
a processor configured to perform a first analysis step using data from an audio file, wherein the audio file is analysed as a plurality of frames positioned at fixed intervals in said audio file; and perform a second analysis step on said data from said audio file using results of said first analysis step, wherein analysis is performed using a plurality of analysis windows and wherein the position of the analysis windows are determined by segmental information, In a second aspect, the present invention provides a method for the prosodic labelling of speech comprising:
performing a first analysis step using data from an audio file, wherein the audio file is analysed as a plurality of frames positioned at fixed time intervals in said audio file; and
performing a second analysis step on said data from said audio file using results of said first analysis step, wherein analysis is performed using a plurality of analysis windows and wherein the position of the analysis windows are determined by segmental information.

In the present invention, first a fine grain analysis is performed where the audio file is broken down into feature frames. Preferably, such feature frames will be extracted in interval step sizes of 20 ms or less, more preferably between 1 and 15 ms, even more preferably about 10 ms.

Next the audio file is broken down into analysis windows which are selected based on segmental information, preferably each analysis window will correspond to a syllable.

The combination of this fine grain analysis with an analysis based on segmental features allows the method and apparatus to be speaker independent and to perform labelling without the need for costly retraining of the system.

In a preferred embodiment, both the first and second analysis steps are rule based and not decision tree based. In a rule based system, many factors may be taken into account at the same time and weighted accordingly without adapting the rules too much to specific training data. An automatic labelling system may also be used instead of or in addition to a rule based system for one or both of the analysis steps. Such an automatic system may use Hidden Markov Models (HMM), decision trees, neural networks, Gaussian mixture models and combinations thereof. An automatic labelling system may be used to perform a part of or all of the first analysis step and/or may also form a part of or all of the second analysis step.

The first analysis step is performed using frames which are located at fixed time intervals in the audio file. The frames have a nominally fixed duration which is equal to the spacing between frame midpoints. Measurements of characteristics of the frame are made within this fixed duration and preferably over time intervals outside the frame within a frame analysis window to determine how characteristics of the voice file change over time before and after the frame midpoint. The frame analysis window is preferably between 100 ms and 500 ms before and after the frame midpoint. More preferably about 400 ms before and after the frame midpoint.

In the first analysis step, the characteristics which may be analysed comprise at least one selected from, whether the frame is voiced, F0, RMS and data concerning how the voiced domain, F0 domain and RMS domain vary over different times before and after the frame midpoint.

When considering behaviour of characteristics before and after the frame midpoint preferably the behaviour of a single characteristic is calculated over more than one time interval, for example the number of smaller F0 values may be measured 50 ms before the frame midpoint as one feature, 100 ms before the frame midpoint as another feature etc.

In a preferred embodiment, each feature will contribute to a score for a prosodic label. The prosodic labels used in a preferred embodiment are the ToBI labels (Beckman, M. E. and Elam, G. "Guidelines for ToBI Labelling", version 3.0, Ohio State University Research Foundation, 1997) which comprise labels for pitch accents (H*, L+H*, H+!H*, !H*, L*+H, L*, H+L* as well as down-stepped or up-stepped variants thereof) and boundary tones (L–, L–L %, L–H %, H–, H–L %, H–H %, %, as well as down-stepped or up-stepped variants thereof). The method and apparatus may be configured to work with any other labelling system. For example, a system where the labels are: un-accented; accented; accented+boundary tone and boundary tone.

A score is preferably provided for each label. The score is awarded using a rule based method.

As the time interval between frame midpoints is typically 10 ms, there will be a plurality of frames within each segmental analysis window and at least one feature frame is selected for each segmental analysis window.

In a preferred embodiment, prosodic labels for pitch accents are scored in the first analysis step and one feature frame is selected for each segmental analysis window on the basis of scores for the pitch accents in the first analysis step. Preferably, the feature frame with the largest score for any pitch accent will be selected.

In some cases, it may be appropriate for a boundary tone to be selected. For example, a boundary tone is expected at the end of a word. If the syllable is the last syllable of a word, then a boundary tone will also be selected from the highest scoring boundary tone ToBI label at the end of a word.

In addition to selecting the results from frames for each segmental analysis window a second analysis step also takes place using characteristics measured within the segmental analysis window and at fixed times before and after the segmental analysis window.

The score from said features in said segmental analysis window are preferably combined with the scores for the feature frame selected for the segmental analysis window to assign a prosodic label to said segmental analysis window.

In a preferred embodiment, the method further comprises performing a third analysis step grouping together results from the second analysis step. For example, the times of prosodic labels assigned to different analysis windows are compared and prosodic labels are deleted if they occur within a predetermined time interval.

The scores of the selected labels may also be compared with a threshold, and labels with a score below a threshold may be deleted.

The first analysis step may further comprise using data from a corpus file comprising data of the duration of individual phonemes and/or using data from a text file containing the text of said audio file.

The preferred features and embodiments of the second aspect of the present invention which relates to the method are also preferred features and embodiments of the first aspect of the invention and the apparatus of the first aspect of the invention may be configured to perform the preferred features and embodiments of the second aspect of the invention.

The present invention can be implemented either in hardware or on software in a general purpose computer. Further the present invention can be implemented in a combination of hardware and software. The present invention can also be implemented by a single processing apparatus or a distributed network of processing apparatuses.

Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

Figure 2:
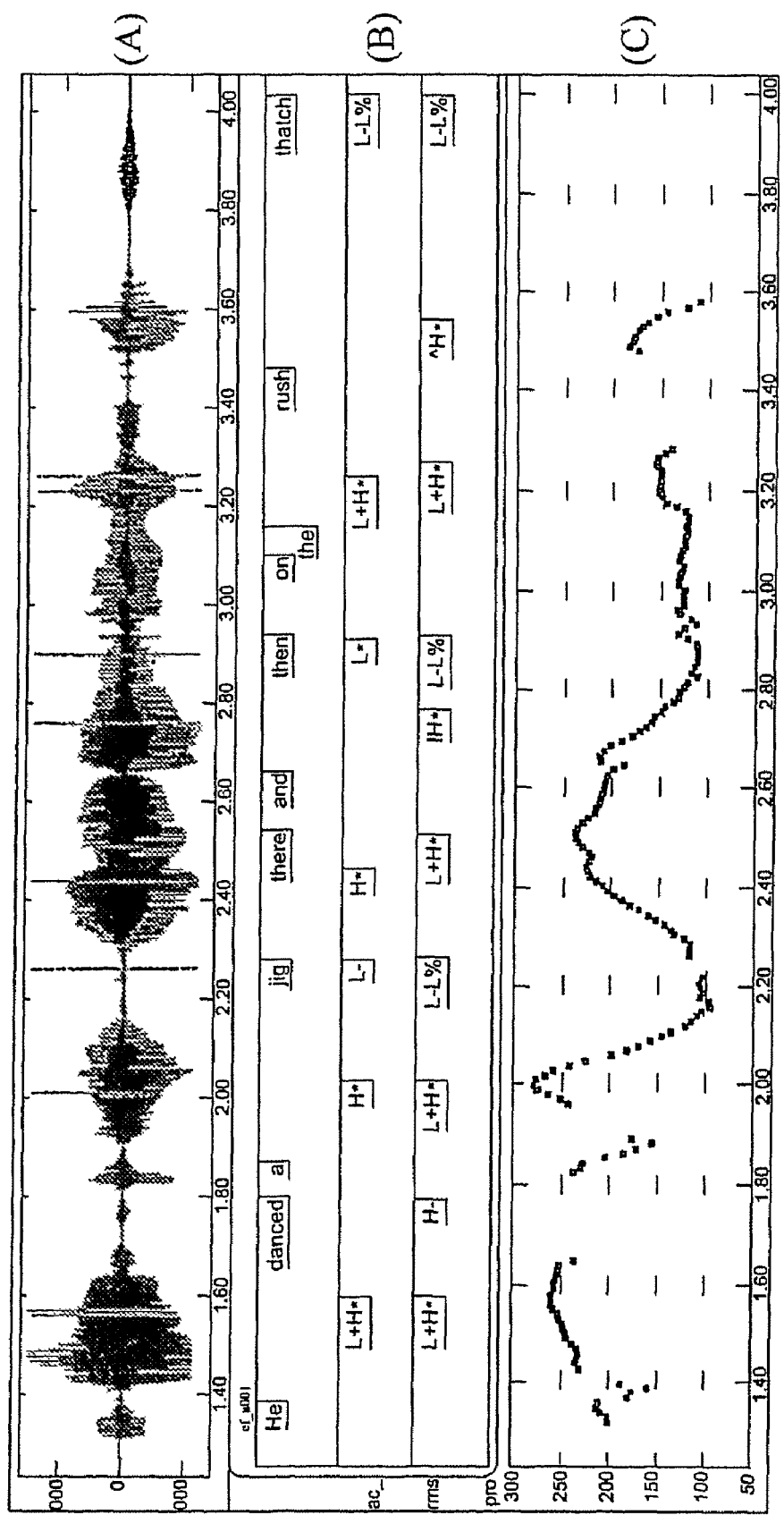

The invention will now be described with reference to the following non-limiting embodiments in which:

FIG. 1 is a flow diagram outlining a method in accordance with a preferred embodiment of the present invention; and FIG. 2(*a*) is a plot of a audio file, FIG. 2*b* shows (i) the word segmentation, (ii) ToBI labels applied by the present invention, and (iii) manually applied ToBI labels; and 2*c* shows the F0 trace.

FIG. 1 is a flow diagram of a method in accordance with an embodiment of the invention used to provide labels to an audio file (Audio). At S101 audio file S101 is provided. Typically, the audio file will be a complete sentence. In addition to the audio file, in this embodiment, the system will also be provided with the text of the audio file (Audio) in step S103. The text of the audio file also includes its phonetic transcription which may be either manually generated or automatically extracted from existing lexicons including phonetic transcriptions of orthographic words (e.g. stars [stA:z]).

In addition to the above information, in step S105 a corpus is provided which consists typically of many audio files from one speaker and corresponding text files listing phonemes and their duration. A phoneme may have a different duration depending on a variety of factors such as the word in which it is used and also the position of the word in sentence etc. This corpus S105 is then analysed in step S107 to determine the mean duration of each phoneme and the standard deviation of each phoneme.

An example of a typical audio file is shown in FIG. 2A. In step S109, the audio file (Audio) is processed to determine F0, RMS and voicing. F0 is the fundamental frequency and can be derived from the audio file using a number of well established methods. The F0 trace for the audio file of FIG. 2A is shown in FIG. 2C.

The RMS (Root-Mean-Square-amplitude) values are calculated from the amplitude values in the audio file (Audio). RMS is an acoustic correlate of perceived loudness and can be derived from the audio file (Audio) using a number of well established methods. The amplitude of the signal is shown in FIG. 2A as the distance to the horizontal zero level.

Voicing is an indication of whether or not the vocal cords are producing quasi-periodic movements. A voiced segment is a segment where there is a periodic element to the audio file of 2A. Examples of voiced segments are vowels and sonorant consonants. F0 is set to zero in voiceless segments and can be estimated using a number of well established methods.

In step S111, segmental and syntactic information is derived from the audio file inputted in S101, the text file inputted in step S103 and the mean duration and standard deviation of the phonemes derived in step S107. Segmental information is phoneme, syllable and word boundaries plus identity and position of lexically stressed syllable. The segmental information may be derived in many ways. For example, phoneme boundaries may be derived from the Audio file using forced alignment methods. Forced alignment is a method that aligns a given sequence of phonemes with a corresponding audio file. The result is a time aligned phoneme sequence that includes the duration of phonemes. Typically Hidden Markov Models are used for forced alignment. The data derived from the forced alignment may be hand corrected.

This information can be used in conjunction with both the text information inputted at step S103 and the duration of the phoneme data from step S107. Generally, if a phoneme is longer than the mean length for that phoneme, the phoneme may be at a word boundary or be prominent within the word.

Syntactic information is part-of-speech tags (PoS), syntactic role tags and each words distance to its syntactic head. Syntactic information can be derived either manually or automatically from the sentence text.

Automatic annotation of syntactic information is provided by part-of-speech (PoS) taggers which have to decide for each word in a sentence, which of the possible PoS tags that a word can have is the correct one in the given sentence context. Furthermore the parser decides for each word in a sentence which syntactic role it fulfils and which other word (its head) it depends upon.

At step S113, the frame based feature vector is determined from the information derived in both of steps S109 and S111. The frame based feature vector contains a plurality of features. In this particular embodiment, the frame based feature vector is calculated in steps of 10 ms and contains features from both the fixed sized analysis windows as well as from the analysis windows determined by the segmental information (phones, syllables, words). The feature vector contains information concerning how the features change over a time period before and after a virtual point i, which is the midpoint of the frame. In this particular embodiment, data for a feature vector will also include information about how the features have changed in the 400 ms before and after the virtual point i.

In this specific embodiment the feature vector comprises the following features: the timestamp; the actual F0 value for the frame; the actual RMS value for the frame; features concerning the Voicing domain; features concerning the F0-domain and features concerning the RMS-domain. In addition, the vector may also comprise segmental-syntactic features or acoustic features that were calculated based on the knowledge about segment boundaries.

The features concerning the voicing domain comprise measurements of the number of voiced features (i.e. where F0≠0) prior to or after point i but within a window of ±400 ms. For example, the features concerning the voicing domain may be the number of voiced values 50 ms before point i (as one feature), the number of voiced values 100 ms before point i (as a separate features), and the number of voiced values 50 ms after point i (as a further feature in the voicing domain).

The features concerning the F0 domain comprise measurements of how the F0 value is changing before or after the point i but within a window of ±400 ms. For example, the features concerning the F0 domain may be the number of increasing F0 values before point i (as one feature), the number of decreasing F0 values before point i (as a separate feature) etc.

The features concerning the RMS domain comprise measurements of the how the RMS value is changing before or after point i but within a window of ±400. For example, the features concerning the RMS domain may be the number of increasing RMS values before point i (as one feature), the number of decreasing RMS values before point i (as a separate feature) etc.

In a preferred embodiment, in excess of 70 features may be measured by calculating how the voiced domain, F0 domain and RMS domain vary over different times before and after point i.

The segmental-syntactic features or acoustic features which may be included are calculated based on the knowledge about segment boundaries and comprise features such as the start and end times of the current phoneme, the start and end times of the current syllable, values relating to the phonemes and syllables surrounding the current frame, information relating to the whole word and sentence, punctuation etc.

All these features are combined into a feature vector including 145 features.

The feature vector which can contain in excess of 145 features is then scored using a scoring algorithm S115. The scoring algorithm scores each of the features against a pitch accent and boundary tone. The pitch accents and boundary tones are described in terms of ToBI labels. The ToBI labels for pitch accents are:
H*, L+H*, H+!H*, !H*, L*+H, L*, H+L* (plus additional up-stepped or down-stepped variants)
The boundary tones are:
L−, L−L %, L−H %, H−, H−L %, H−H %, % (plus additional up-stepped or down-stepped variants)

The scoring takes place using known criteria. Each pitch accent or boundary tone is associated with certain characteristics. For example, high pitch accents are usually associated with relatively high levels of F0 (e.g. maxima in the course of F0 or other rising F0 characteristics). Therefore, the scoring algorithm checks the number of increasing F0 values before the current value and also estimates the amount of increase of F0 in order to estimate the relative "prominence" of a particular feature vector. The scoring algorithm is configured so that high scores are obtained for a particular label where the feature values associated with that label are measured.

After the first scoring algorithm has been completed, a plurality of frames are left with a score against each of the pitch accents and boundary values for each of the frames.

For example:

TABLE 1

| VectorX | F0 | RMS | (all other features) | H* | L + H* | L* | L-L % | H-H % | (all other Tones) |
|---|---|---|---|---|---|---|---|---|---|
| vector1 | 121 | 012 | ... | 77 | 67 | 11 | | | ... |
| vector2 | 130 | 120 | ... | 78 | 68 | 14 | | | ... |
| vector3 | 131 | 290 | ... | 81 | 79 | 10 | | | ... |
| vector4 | 143 | 355 | ... | 95 | 86 | 9 | | | ... |
| vector5 | 134 | 789 | ... | 76 | 61 | 8 | | | ... |
| vector6 | 121 | 554 | ... | 61 | 31 | 5 | | | ... |
| vector7 | 119 | 242 | ... | 51 | 22 | 19 | | | ... |
| vector8 | 116 | 120 | ... | 22 | 13 | 12 | 88 | 10 | ... |

The above table is just an illustrative simple example, in practice all features will be measured and scored.

The next step S is to construct a syllable based vector in S117. The syllable based vector differs from the initial feature vector in that boundaries of the syllable based vector are determined by the start and end of syllables. The duration of a syllable varies from syllable to syllable and can vary for the same syllable when used in different words or in different parts of the sentence.

The start and end times of the syllable are already known before this stage of the process is reached. The start and end times of the syllables are known from the initial input data.

The syllables are derived using a two step process:
1. The phonetic transcription of the word is automatically syllabified; and
2. the start and end times of each syllable are looked up in the phone label file, that is the text file including the phoneme boundaries.

Usually, a syllable will contain many feature vectors. Each syllable will contain an integer number of feature vectors.

One of the many feature vectors within the syllable is then selected. This is done by selecting the feature vector with the largest score for an individual pitch accent. For example, taking the frames in table 1, frame 4 would be selected because it has the largest score for an individual pitch accent out of all of the frame vectors.

In addition, if the syllable is the last in the word, it is also assigned a boundary tone which is taken to be the last feature vector within the syllable (in this case vector 8). The boundary tone with the largest score is used as the label for this vector at the end of a word.

The syllable feature vector contains part of the features specified for the initial feature vector. Almost all the features calculated in the fixed 400 ms analysis window are ruled out. However, additionally, it also has the following features: F0 contour for current syllable (fall, rise, fall-rise, rise-fall) calculated on basis of the initial, final and mean F0 (cf. Wightman and Ostendorf "Automatic Labelling of Prosodic Patterns", IEEE Transactions of Speech and Audio Processing, vol. 2, no 4, pp 469-481, October 1994).; Is the current syllable stressed?; Is this frame the nucleus (vowel), no nucleus, syllable final, word-final?; Mean F0 in current syllable; Maximum F0 in current syllable; Minimum F0 in current syllable; Mean F0 in current vowel; Maximum F0 in current vowel; Minimum F0 in current vowel; Mean F0 in sentence; Number of increasing F0 values before current F0 value; Amount of F0 increase before; Number of decreasing F0 values before; Amount of decreasing F0 values before; Normalized duration of the current phone; Normalized duration of the syllable; Normalized duration of rhyme—onset; Normalized duration of the rhyme; Difference of the normalized duration of the 3 syllables prior to the word-final syllable and the 3 syllables following the word-final syllable (cf. Wightman and Ostendorf "Automatic Labelling of Prosodic Patterns", IEEE Transactions of Speech and Audio Processing, vol. 2, no 4, pp 469-481, October 1994).; Mean RMS in current syllable; Maximum RMS in current syllable; Minimum RMS in current syllable; Mean RMS in current vowel; Maximum RMS in current vowel; Minimum RMS in current vowel; Mean RMS over the whole sentence (excluding parts that have unvoiced periods longer than 400 ms); Duration of pause after syllable; PoS (part-of-speech); Syntactic role; Punctuation after current word; Tone; Score; Ratio of maximum F0 in this syllable to the mean F0 of the next syllable; Ratio of maximum F0 in this syllable to the maximum F0 of the previous syllable; Ratio of maximum F0 to the mean F0 within this syllable and Ratio of minimum F0 to the mean F0 within this syllable (cf. Wightman and Ostendorf "Automatic Labelling of Prosodic Patterns", IEEE Transactions of Speech and Audio Processing, vol. 2, no 4, pp 469-481, October 1994).

The above features in addition to the features which are scored for the frame based vectors are used for the syllable based feature vector.

The syllable based feature vector is then scored S119 in the same manner (except with the extra features) as described in S115.

Then a new score is derived from the selected frame based vector with the highest score for a pitch accent. This is combined with the results from the syllable vector scoring to give a single pitch accent for the syllable. If the syllable is a syllable at the end of a word, then a boundary tone will also be used as part of the label.

The tone mapping step S121 is the final step and views the data for multiple syllables over a much longer timescale. The tone mapping applies certain restrictions, for example, two pitch accents are not allowed to occur within 90 ms of one another. If this happens, then one of the pitch accents is deleted. The deleted accent will be the one with the lowest score.

Finally, threshold values are set for the pitch accents and boundary tones. If the score for a particular pitch accent or boundary tone does not exceed a particular value then this pitch accent or boundary tone will not be selected.

The above example relates to a system where both an audio file and the text of the audio file are given to the system. In an example useful for understanding the invention, the system may also function if no text file or corpus is given to the system. In this case the output will be determined by scoring the acoustic features without any knowledge about segmental or syntactic information.

The invention may be used for annotating speech synthesis databases with prosodic labels. The system could also be used in automatic speech recognition systems as additional information in order to separate competing word hypotheses. Furthermore the system could be used in computer assisted language learning programs by helping the user to detect incorrect pronunciations.

The invention claimed is:

1. An apparatus for the prosodic labelling of speech comprising:
   a computer programmed to execute plural programmed units, including:
   a receiving unit configured to receive an audio file and a text file corresponding to the audio file;
   a first analysis unit configured to analyze the audio file as a plurality of frames positioned at fixed time intervals in said audio file, said first analysis unit extracting features for each frame from said audio file to form a feature vector for each frame and scoring said features to determine a score for a plurality of prosodic labels for each frame; and
   a second analysis unit configured to analyze said audio file using results of said first analysis unit, said second analysis unit being configured to
   (a) determine positions of a plurality of analysis windows, each analysis window comprising a plurality of frames, based on segmental information obtained from the audio file and a text file corresponding to the audio file,
   (b) select a feature vector within each analysis window on the basis of the scores determined by the first analysis unit,
   (c) extract further features from the audio file for each analysis window and combining with said feature vector to construct a segment feature vector for each said analysis window,
   (d) score features of said segment feature vector for each analysis vector to determine a score for a plurality of prosodic labels, and
   (e) select a prosodic label with the highest score for each analysis window.

2. A method for the prosodic labelling of speech comprising:
   receiving by a computer an audio file and a text file corresponding to said audio file;
   performing a first analysis step using data from the audio file, wherein the audio file is analysed as a plurality of frames positioned at fixed time intervals in said audio file, said first analysis step comprising extracting features for each frame from said audio file to form a feature vector for each frame and scoring said features to determine a score for a plurality of prosodic labels for each frame; and
   performing a second analysis step on said data from said audio file using results of said first analysis step, including
   (a) determining positions of a plurality of analysis windows, each analysis window comprising a plurality of frames based on, segmental information obtained from the audio file and the text file corresponding to the audio file,
   (b) selecting a feature vector within each analysis window on the basis of the scores determined in the first analysis step,
   (c) extracting further features from the audio file for each analysis window and combining with said feature vector to construct a segment feature vector for each said analysis window,
   (d) scoring the features of said segment feature vector for each analysis window to determine a score for a plurality of prosodic labels, and
   (e) selecting a prosodic label with the highest score.

3. A method according to claim 2, wherein the segmental information comprises syllable boundaries.

4. A method according to claim 2,
wherein the times of prosodic labels assigned to different analysis windows are compared and prosodic labels are deleted if they occur within a predetermined time interval.

5. A method according to claim 2, wherein said first analysis step uses a rule based system.

6. A method according to claim 2, wherein said second analysis step uses a rule based system.

7. A method according to claim 2, wherein the first analysis step comprises considering features within the frame and also the behaviour of features within fixed time intervals before and after the midpoint of the frame.

8. A method according to claim 2, wherein the features which are analysed in the first analysis step comprise at least one selected from, whether the frame is voiced, F0, RMS and data concerning how the voiced domain, F0 domain and RMS domain vary over different times before and after the midpoint of the frame.

9. A method according to claim 2,
further comprising determining if a prosodic label for a boundary accent is appropriate and selecting a further frame for said analysis window on the basis of the scores for the boundary accent and the temporal position of the frame.

10. A method according to claim 2, wherein second analysis step considers features within the analysis window and the behaviour of features at fixed times before and after the analysis window and the frames selected from the first analysis step.

11. A method according to claim 2, wherein said second analysis step scores prosodic labels for said analysis window using at least one feature selected from whether the frame is voiced, F0, RMS and data concerning how the voiced domain, F0 domain and RMS domain vary over different times before and after the frame.

12. A method according to claim 2,
wherein said score from said features in each said analysis window are combined with the scores for the frame selected for window to assign a prosodic label to said window.

13. A method according to claim 2, wherein said first analysis step further comprises using data from a corpus file comprising data of the duration of individual phonemes.

14. A method according to claim 2, wherein said first analysis step further comprises using data from a text file containing the text of said audio file.

15. A method according to claim 2, wherein the frames are closer together in time than the analysis windows such that a plurality of frame midpoints are within each analysis window.

16. An apparatus for the prosodic labelling of speech comprising:
a computer programmed to execute plural programmed units, including:
a receiving unit configured to receive an audio file and a text file corresponding to said audio file;
a first analysis unit configured to analyze the first audio file as a plurality of frames positioned at fixed time intervals in said audio file, said first analysis unit extracting features for each frame from said audio file to form a feature vector for each frame and scoring said features to determine a score for a plurality of prosodic labels for each frame; and
a second analysis unit configured to analyze said data from said audio file using results of said first analysis unit, said second analysis unit configured to
(a) determine positions of a plurality of analysis windows, each analysis window comprising a plurality of frames, by segmental information obtained from the audio file and the text file corresponding to the audio file,
(b) select a feature vector within each analysis window on the basis of the scores determined in the first analysis step,
(c) extract further features from the audio file for each analysis window and combining with said feature vector to construct a segment feature vector for each said analysis window,
(d) score the features of said segment feature vector for each analysis window to determine a score for a plurality of prosodic labels, and
(e) select a prosodic label with the highest score; and
an output unit configured to use the selected prosodic label in at least one of text to speech conversion, automatic speech recognition, linguistic analysis of speech, and detection of incorrect pronunciation.

17. A method for the prosodic labelling of speech comprising:
receiving by a computer an audio file and a text file corresponding to said audio file;
performing a first analysis step using data from the audio file, wherein the audio file is analysed as a plurality of frames positioned at fixed time intervals in said audio file, said first analysis step comprising extracting features for each frame from said audio file to form a feature vector for each frame and scoring said features to determine a score for a plurality of prosodic labels for each frame; and
performing a second analysis step on said data from said audio file using results of said first analysis step, including
(a) determining positions of a plurality of analysis windows, each including a plurality of frames, by segmental information obtained from the audio file and the text file corresponding to the audio file,
(b) selecting a feature vector within each analysis window on the basis of the scores determined in the first analysis step,
(c) extracting further features from the audio file for each analysis window and combining with said feature vector to construct a segment feature vector for each said analysis window,
(d) scoring the features of said segment feature vector for each said analysis window to determine a score for a plurality of prosodic labels, and
(e) selecting a prosodic label with the highest score; and
using the selected prosodic label in at least one of text to speech conversion, automatic speech recognition, linguistic analysis of speech, and detection of incorrect pronunciation.

* * * * *